United States Patent [19]
Opower et al.

[11] Patent Number: 5,936,993
[45] Date of Patent: Aug. 10, 1999

[54] LASER SYSTEM

[75] Inventors: Hans Opower, Krailling; Rolf Nowack, Leonberg, both of Germany

[73] Assignee: Deutsche Zentrum Fuer Luft- und Raumfahrt e.V., Bonn, Germany

[21] Appl. No.: 08/961,922

[22] Filed: Oct. 31, 1997

[30] Foreign Application Priority Data

Nov. 1, 1996 [DE] Germany ................................ 196 45 093

[51] Int. Cl.⁶ ............................................... H01S 3/081
[52] U.S. Cl. ........................... 372/93; 372/92; 372/95; 372/97; 372/99; 372/108
[58] Field of Search ............................ 372/92, 93, 95, 372/97, 98, 99, 107, 108

[56] References Cited

U.S. PATENT DOCUMENTS

| | | | |
|---|---|---|---|
| 4,300,106 | 11/1981 | Hohl et al. ........................ | 372/93 X |
| 4,423,511 | 12/1983 | Morton ............................. | 372/95 |
| 4,429,398 | 1/1984 | Chenausky et al. ................ | 372/64 |
| 4,438,514 | 3/1984 | Chenausky et al. ................ | 372/64 |
| 4,468,778 | 8/1984 | Karning et al. ................... | 372/108 |
| 4,491,950 | 1/1985 | Hoffman .......................... | 372/95 |
| 4,779,286 | 10/1988 | Wheatley .......................... | 372/93 |
| 4,939,738 | 7/1990 | Opower ............................ | 372/95 |
| 5,088,105 | 2/1992 | Scifres et al .................... | 372/92 |
| 5,097,479 | 3/1992 | Opower ............................ | 372/95 |

FOREIGN PATENT DOCUMENTS

| | | | |
|---|---|---|---|
| 0 305 893 | 3/1989 | European Pat. Off. ............ | 385/93 X |
| 39 43 373 | 7/1991 | Germany .......................... | 385/93 X |
| 42 03 225 | 8/1993 | Germany .......................... | 385/93 X |
| 44 07 710 | 9/1995 | Germany .......................... | 385/93 X |

*Primary Examiner*—Brian Healy
*Attorney, Agent, or Firm*—Barry R. Lipsitz

[57] ABSTRACT

In order to improve upon a laser system, comprising a laser-active medium which is arranged between mutually opposed waveguide surfaces of an optical waveguide and a resonator which by means of resonator mirrors defines a coherent resonator radiation field permeating the optical waveguide and from which a plurality of mutually coherent radiation fields issue, in such manner that higher laser output power levels can be attained it is proposed that the plurality of radiation fields are conducted as coupled-out radiation fields to a coupling element, and that the coupling element combines the plurality of radiation fields with a defined mutual phase relationship to form one single coherent output radiation field.

24 Claims, 9 Drawing Sheets

LASER SYSTEM

The invention relates to a laser system comprising a laser-active medium which is arranged between mutually opposed waveguide surfaces of an optical waveguide and a resonator which by means of resonator mirrors defines a coherent resonator radiation field permeating the optical waveguide and from which a plurality of mutually coherent radiation fields issue.

Such a laser system has been disclosed in DE-39 43 373-A1. In this laser system, although a plurality of mutually coherent radiation fields issue from the resonator, they are all reflected back except for one and this one coupled-out radiation field serves as output radiation field.

In such laser systems the problem exists of achieving higher output power levels, which necessitates an increase in the space available for the laser-active medium. Normally this is achieved by means of an enlarged resonator radiation field and a correspondingly enlarged waveguide.

However, it has proved that in the event of such an enlargement of the resonator radiation field, the coupling out of relatively high power levels presents problems since, due to a large number of geometrical influences, the cross-sectional area of the coupled-out radiation field cannot be enlarged in the same way as the resonator radiation field itself and the waveguide.

Therefore the object of the invention is to improve upon a laser system of the type defined in such manner as to facilitate the attainment of higher laser output power levels.

This object is achieved in a laser system of the type described in the introduction, in accordance with the invention in that the plurality of radiation fields are conducted, as coupled-out radiation fields, to a coupling element and that the coupling element combines the plurality of radiation fields with a defined mutual phase relationship to form one single coherent output radiation field.

The solution of the present invention can thus be contrasted with the teaching of DE-39 43 373 which in fact avoids the coupling out of a plurality of radiation fields from the resonator and instead reflects back all the radiation fields, except for one, into the resonator in order to obtain only one coupled-out radiation field, in which a defined phase relationship exists over its cross-section.

In contrast, the solution of the present invention advantageously exploits the fact that on the one hand only one single resonator radiation field is present in the resonator and on the other hand a plurality of radiation fields issue from the resonator by virtue of its configuration, in order that, despite the limitation of the individual radiation fields due to a number of geometrical effects, as much overall power as possible can be coupled out from the resonator radiation field and then, for a high-power application, this power can be combined, with a defined phase relationship, to form one single coherent output radiation field, so that despite being reassembled from the plurality of individual radiation fields this output radiation field has a defined phase relationship over its overall cross-section and thus can be imaged, and in particular focussed, in an advantageous manner.

In order to combine the individual radiation fields with a defined phase relationship it would be necessary to provide optical paths of defined length for these radiation fields from the resonator radiation field up to the coupling element. As this is costly and corrections may also be required, advantageously it is provided that at least one radiation field passes through a phase adjustment element upstream of the coupling element so that this radiation field is phase-adjustable in relation to another radiation field.

Many different possibilities are conceivable with regard to the combining of the individual radiation fields by the coupling element to form one single output radiation field. Thus for example it is advantageous for the coupling element to superimpose the radiation fields in the output radiation field, i.e. for the output radiation field to possess substantially the same cross-section as each of the individual radiation fields arranged superimposed in said output radiation field.

Alternatively, it is advantageously provided that the coupling element arranges the individual radiation fields one beside another in the output radiation field so that the cross-section of the output radiation field finally corresponds to a multiple of the cross-section of the individual radiation fields.

In order, in particular in the case of more than two radiation fields, to be able easily to form one single output radiation field, advantageously it is provided that for the formation of the single coherent output radiation field a plurality of coupling elements arranged in a cascade-like formation are provided, each of the coupling elements preferably combining two radiation fields with one another to form one single radiation field which then in turn is combined with a further radiation field by a further coupling element.

Various possibilities are conceivable as regards the phase relationships in the output radiation field. For example, it would be conceivable to contrive the phase relationships such that the output radiation field focuses itself by virtue of the superimposition of the individual radiation fields with a different phase.

However in order to be able to use the output radiation field in a conventional manner, in the simplest situation it is provided that the output radiation field has substantially flat wave fronts and thus can be focussed in a simple manner, in particular in the manner of a parallel beam.

Ideally, the radiation fields coupled out from the single resonator radiation field are completely coherent with one another. However, this ideal situation is difficult to achieve in practice. It is however particularly advantageous for the plurality of radiation fields at least to have a coherence length of 50 cm.

No precise details have been given concerning the design of the resonator in association with the previous explanation of the individual exemplary embodiments. Thus a particularly advantageous exemplary embodiment provides that the resonator is designed as an unstable resonator. An unstable resonator of this kind is preferably constructed in such manner that the radiation field is propagated in a transverse direction at right angles to the resonator axis and in a longitudinal direction in parallel to the resonator axis.

In order to achieve the best possible conditions as regards the focusability of the issuing radiation fields, preferably it is provided that the resonator is designed as an unstable resonator operating in the transverse basic mode. An unstable resonator of this type has the advantage that the coupled-out radiation fields have no mode-related intensity variations in cross-section.

The resonator mirrors of the unstable resonator can basically have any form known from previously disclosed designs of unstable resonators. However, a particularly advantageous design provides that the resonator comprises resonator mirrors which are curved in the transverse direction extending at right angles to the resonator axis in which the resonator radiation field is propagated, but have no curvature perpendicular to the transverse direction and at right angles to the resonator axis.

Although such a design avoids the need for additional focusing by the resonator mirrors, this is slightly disadvantageous inasmuch as the waveguide surfaces extend at right angles to the resonator axis and in parallel to the transverse direction and thus prevent an expansion of the resonator radiation field at right angles to the transverse direction.

Such resonator mirrors, curved only in one direction, can be constructed particularly advantageously if the resonator mirrors have cylindrical mirror surfaces. Such cylindrical mirror surfaces can be produced particularly simply. In order to obtain radiation fields from the resonator which can be guided as simply as possible and can be simply combined, advantageously it is provided that the resonator comprises resonator mirrors arranged in pairs confocally with one another.

In the simplest example, a laser system according to the invention can be designed in such manner that it comprises a resonator which is constructed from two resonator mirrors and which has a plurality of—in the case of an unstable resonator preferably two—coupled-out radiation fields.

In order however to attain particularly high power levels and in particular to attain high power levels by means of a plurality of coupled-out radiation fields, it is particularly advantageous for the resonator to comprise a plurality of resonator sections which are permeated by the coherent resonator radiation field and which allow the resonator to be constructed as compactly as possible and thus allow the highest possible output power to be obtained in as space-saving as possible a construction.

Here it is conceivable, for example, to form the resonator radiation field in such manner that individual resonator section radiation fields of the resonator sections are branches of the resonator radiation field and for example emanate from the latter. However it is particularly advantageous, in particular in order to define a uniform mode of the resonator radiation field, for the resonator radiation field to permeate the resonator sections consecutively in the radiation propagation direction.

In the simplest situation a resonator radiation field of this type can be obtained in that the resonator section axes of consecutive resonator sections form an acute angle with one another and the resonator sections thus extend in a "V-like" formation relative to one another or, in the case of a plurality of resonator sections, in a "zig-zag-like" formation relative to one another.

In order that, in the case of the described arrangement of the resonator sections relative to one another, a uniform and mode-defined resonator radiation field can be obtained with the simplest possible means, preferably it is provided that the resonator section radiation fields of consecutive resonator sections are coupled by means of a resonator mirror arranged as resonator section coupler.

To avoid all types of distortions, advantageously it is provided that the resonator mirror formed as resonator section coupler reflects the whole of the resonator section radiation field of the one resonator section in parallel to one single reflection plane, with the same reflection angle, into the other resonator section.

In particular in the case of cylindrical resonator mirrors, preferably it is provided that the axes of curvature of the resonator mirrors also lie in the reflection plane, so that this also serves to prevent the occurrence of any distortions upon the reflection of the resonator section radiation fields.

Preferably the reflection plane is perpendicular to the waveguide surfaces so that, by virtue of the small spacing between the waveguide surfaces compared to their extent in the transverse and longitudinal directions, the inclination of the resonator section coupler relative to the waveguide surfaces distorts the resonator section radiation field either not at all or only insubstantially.

A particularly advantageous configuration, optimal in particular in respect of the resonator radiation field, provides that all the reflection planes of all the resonator mirrors in the form of resonator section couplers extend in parallel to one another, preferably in one single plane. In this case only a strictly symmetrical reflection of the respective resonator section radiation fields by the resonator section couplers in each case occurs and distortions upon reflection are thus substantially avoided.

In principle it would be possible for the individual resonator section radiation fields to have different forms. However, a particularly expedient embodiment provides that the individual resonator section radiation fields are of identical formation. That is to say that the resonator mirrors which define these resonator section radiation fields represent an identical configuration for each of these resonator section radiation fields, i.e. are preferably formed identically in pairs and are arranged identically relative to one another.

In order also to be able to couple out the highest possible power level when a resonator constructed from a plurality of resonator sections is used, in particular in the case of a limited cross-section of the individual radiation field, preferably it is provided that at least one radiation field is coupled out from each resonator section radiation field.

It is even more advantageous for two radiation fields to be coupled out from each resonator section radiation field.

This can be achieved particularly expediently if each of the resonator section radiation fields is formed symmetrically to the resonator axis and the two radiation fields likewise issue symmetrically to the resonator axis.

No precise details have been given concerning the form of the laser-active medium in association with the previous description of the individual embodiments of the laser system according to the invention. Thus for example it would be conceivable to use a solid body as laser-active medium. However it is particularly advantageous for the laser-active medium to be a gas, for example $CO_2$.

Additionally, the laser-active medium could be excited and for example circulated and cooled outside of the waveguide. However, a concept particularly suitable for a waveguide provides that the laser-active medium is diffusion-cooled in the waveguide.

In order also to obtain a particularly advantageous excitation of the laser-active medium, it is provided that the laser-active medium is excited by high frequency. Such excitation of the laser-active medium by high frequency can be performed particularly simply in that the optical waveguide comprises two electrodes bearing the waveguide surfaces so that between the waveguide surfaces a high-frequency discharge can be generated, via which the gaseous laser-active medium is excited.

Further features and advantages of the invention form the subject of the following description and illustration of some exemplary embodiments. In the drawing.

Figure 1:
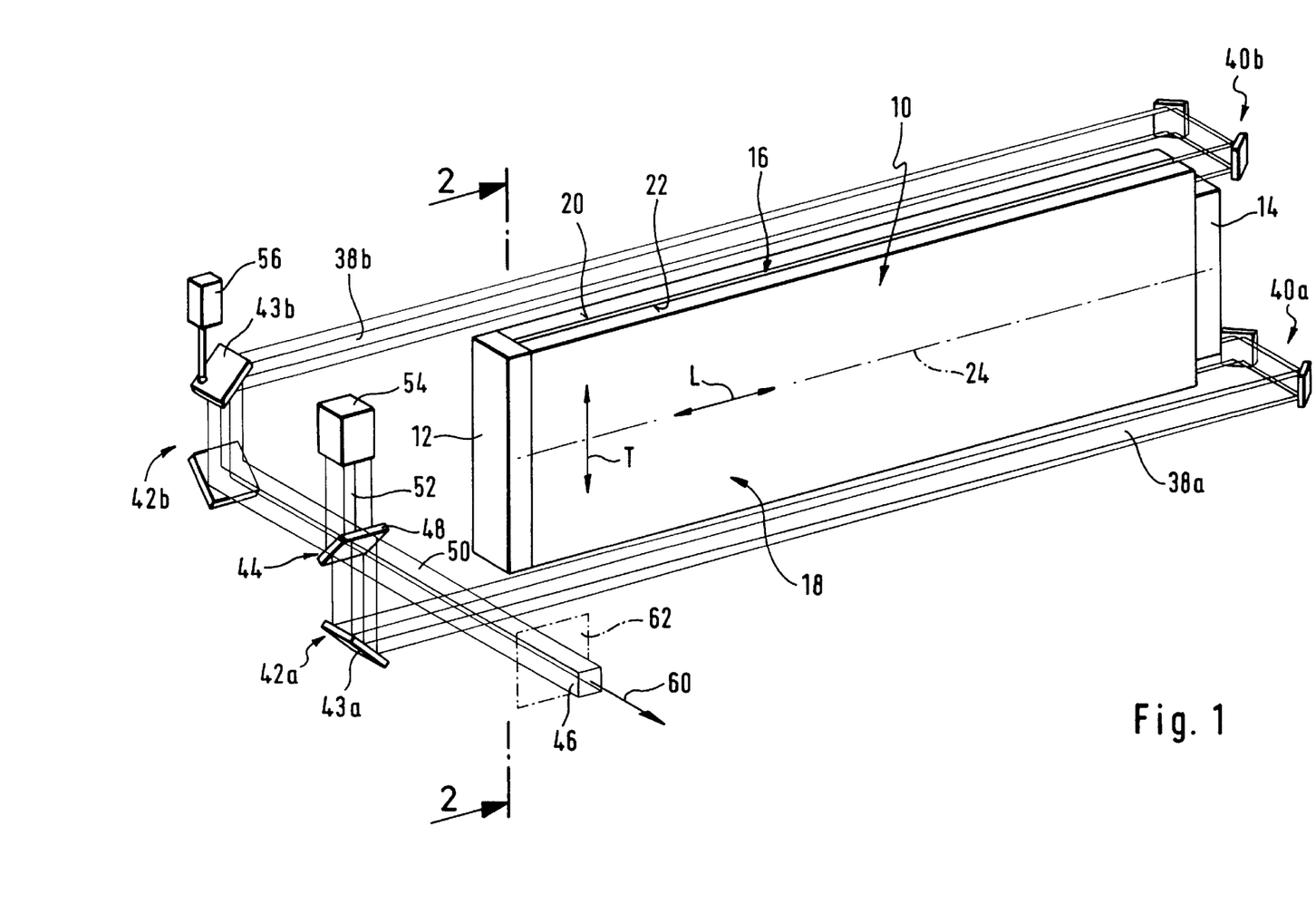
FIG. 1 is a schematic, perspective diagram of a first exemplary embodiment of a laser system according to the invention.

A first exemplary embodiment, shown in FIG. 1, of a laser system according to the invention comprises a resonator bearing the overall reference 10 and comprising resonator mirrors 12 and 14. A resonator radiation field 16 defined by the resonator mirrors 12 and 14 here is guided between the resonator mirrors 12 and 14 by a waveguide or strip conductor bearing the overall reference 18, which has mutually facing waveguide surfaces 20 and 22 extending substantially at a constant distance from one another which conduct the laser radiation field between the resonator mirrors 12 and 14 by back- and forth reflection.

Here the waveguide surfaces 20 and 22 extend on the one hand in a longitudinal direction L in parallel to an optical axis 24 of the resonator 10 and in a transverse direction T at right angles to the latter over the whole of the extent of the resonator mirrors 12 and 14 at right angles to the optical axis 24 and in parallel to the waveguide surfaces 20 and 22.

Figure 2:
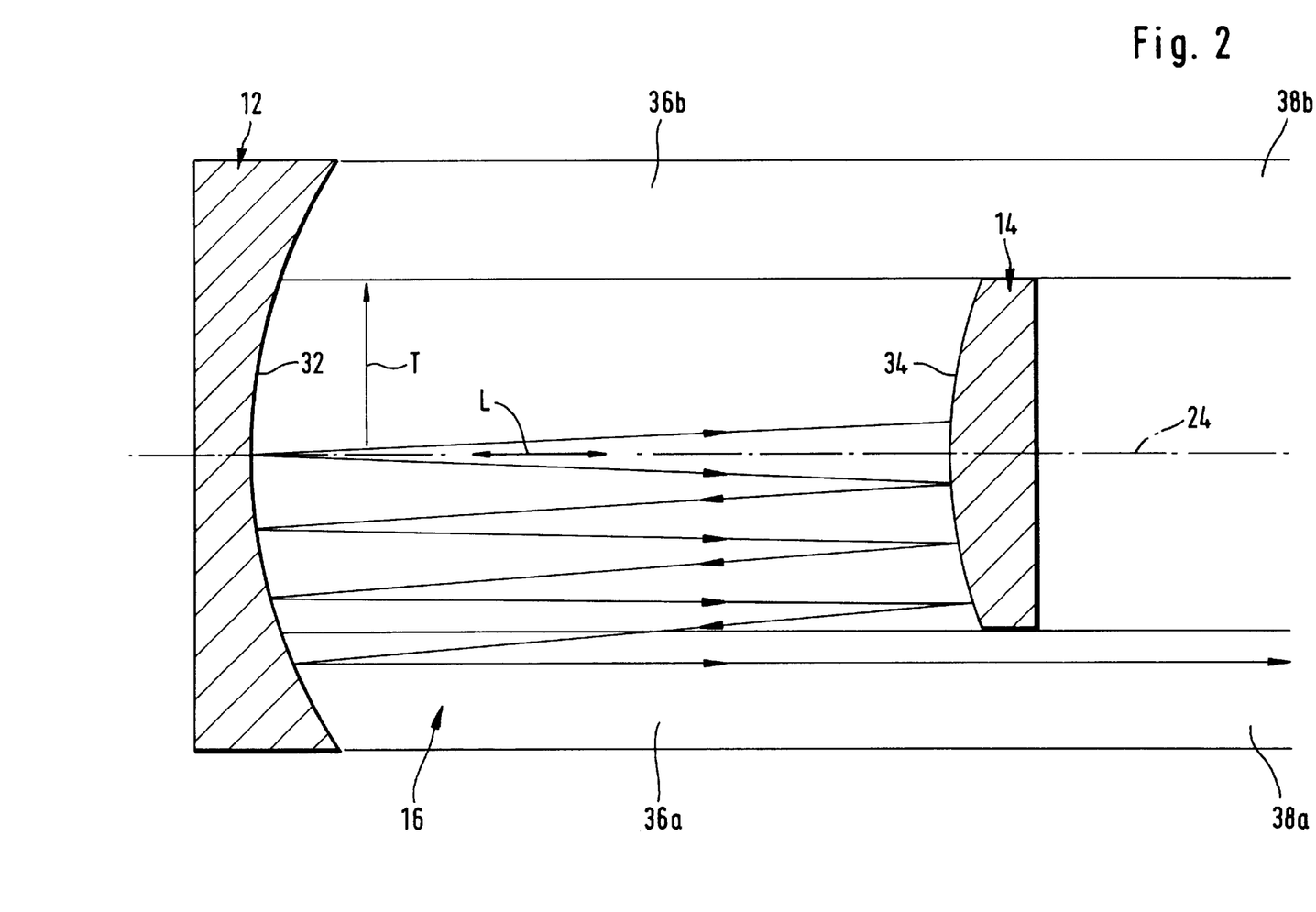
FIG. 2 is a section along the line 2—2 through a resonator of the laser system according to FIG. 1.

As shown in section in FIG. 2, the resonator mirror 12 has a resonator mirror surface 32 which is cylindrical to an axis of curvature perpendicular to the drawing plane, and the resonator mirror 14 has a resonator mirror surface 34 likewise cylindrical to an axis of curvature perpendicular to the drawing plane, the resonator mirror surfaces 32 and 34 being arranged confocally with one another and the focus being located on the optical axis 24.

Here the resonator 10 can be formed as a so-called confocal resonator with a "positive branch", as shown in FIG. 2, or also as a confocal, unstable resonator with a so-called "negative branch", in which case not only the resonator mirror surface 32, but also the resonator mirror surface 34 is concavely curved.

In the exemplary embodiment of an unstable resonator shown in FIG. 2, an oscillatory build-up takes place in accordance with the wavelength defined by the resonator in the region of the optical axis 24 and then, by back and forth reflection between the resonator mirrors 12 and 14, the resonator radiation field is propagated at right angles to the optical axis 24 and in parallel to the waveguide surfaces 20 and 22 up to an outer subsidiary radiation field 36 of the resonator radiation field 16, which is then propagated from the concave resonator mirror 12 towards the resonator mirror 14 and issues from the resonator 10 past the resonator mirror 14 in the form of a radiation field.

As the resonator mirrors 12 and 14 are arranged symmetrically to the optical axis 24, the resonator radiation field is also propagated symmetrically to the latter so that the subsidiary radiation fields 36a and 36b also occur symmetrically to the optical axis 24, which subsidiary radiation fields 36a and 36b, having issued from the resonator 10, then give rise to the two coupled-out radiation fields 38a and 38b, which two radiation fields 38a and 38b emanate from one single coherent resonator radiation field 16 due to the oscillatory build-up condition of the resonator 10 occurring along the optical axis 24, and thus themselves are coherent and have a defined phase in relation to one another.

As illustrated in FIG. 1, these coherent radiation fields 38a and 38b are deflected by a deflecting optical device 40a and 40b in such manner that they extend along the waveguide 18 approximately in parallel to the optical axis 24 and then are deflected again by a deflecting optical device 42a and 42b and specifically to a coupling element bearing the overall reference 44.

Each of the deflecting optical devices 42a, 42b comprises a cylindrical mirror 43a, 43b which corrects a divergence of the radiation fields 38a, 38b and thus forms radiation fields 38a, 38b which are propagated substantially neither divergently nor convergently, i.e. with a cross-section which remains substantially constant. The following coupling element 44 combines these two radiation fields 38a and 38b by arranging them one above another and thus forming an output radiation field 46.

Here the coupling element 44 is constructed similarly to a Michelson interferometer and comprises a semi-permeable, semi-reflective plate 48 which in each case reflects a part of the radiation fields 38a or 38b but allows the other part to pass through and thus generates two superimposed radiation fields 50 and 52, the two radiation fields 38a and 38b being superimposed in the superimposed radiation field 50 with a phase definition such that a constructive interference occurs, whereas in the superimposed radiation field 52 the two radiation fields 38a and 38b are superimposed in such manner that a destructive interference occurs. The constructive interference in the superimposed radiation field 50 and the destructive interference in the superimposed radiation field 52 can be adjusted in relation to one another by adjustment of the phases of the radiation fields 38a and 38b, the destructive interference being adjustable with the aid of a detector 54 which detects the intensity of the superimposed radiation field 52.

The adjustment of the phases of the radiation fields 38a and 38b can take place in a simple manner in that one of the deflecting elements 42b has the form of a phase adjusting element and can be positioned via a positioning device 56, for example the cylindrical mirror, with a definition such that the relative phase position between the radiation field 38a and the radiation field 38b can be adjusted.

In an optimal situation the sensor 54 measures the intensity zero, i.e. in the superimposed radiation field the destructive interference leads to the extinguishing of the two radiation fields 38a and 38b. In contrast, the constructive interference in the superimposed radiation field 50 then leads to the formation of the output radiation field 46 with wave fronts extending at right angles to the propagation direction 60 of the output radiation field 46 and parallel to a plane 62, so that the output radiation field can be focussed in a simple manner.

Figure 3:
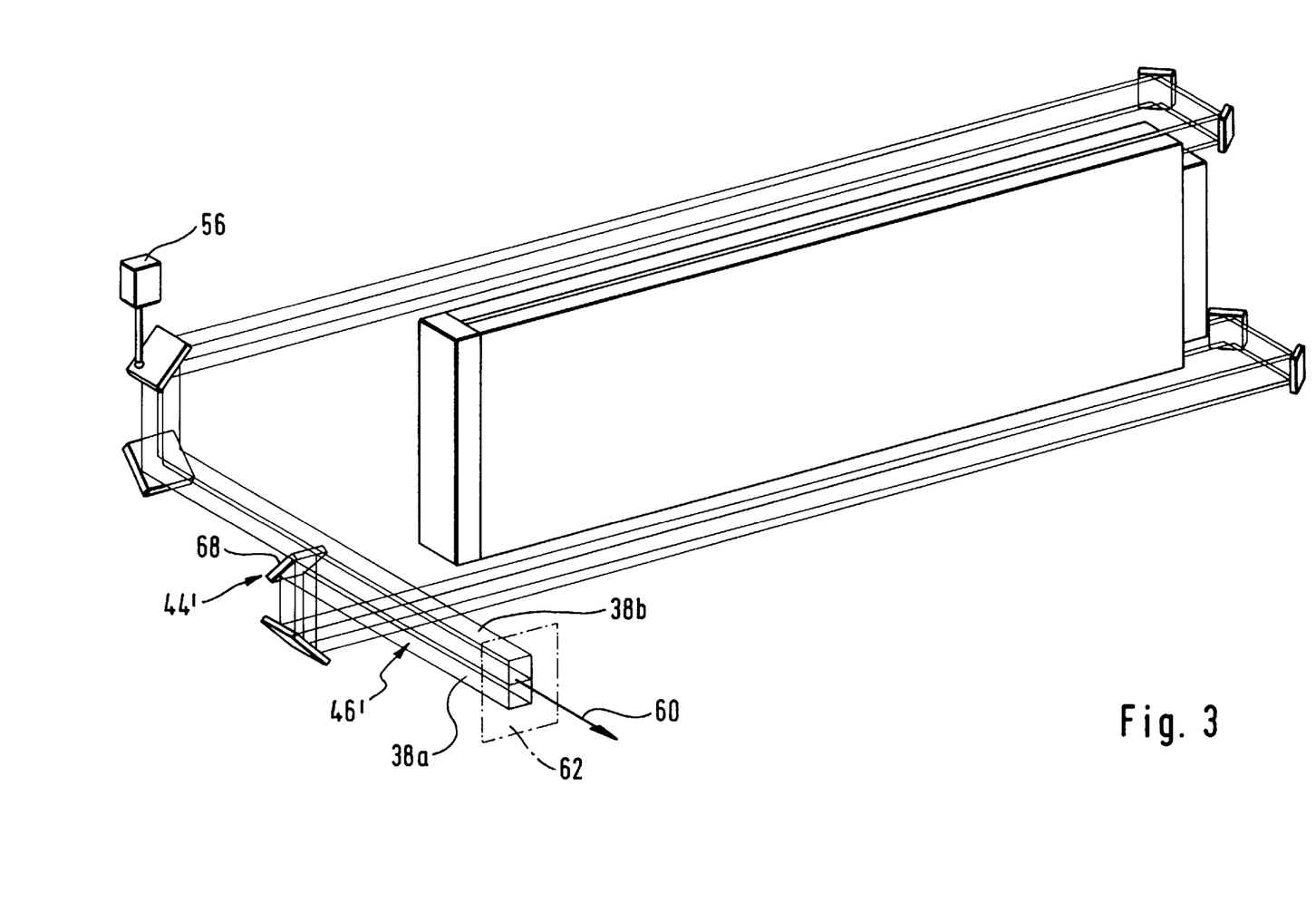
FIG. 3 is a diagram corresponding to FIG. 1 of a first variant of the first exemplary embodiment.

In a first variant of the first exemplary embodiment illustrated in FIG. 3, the parts which are identical to those in the first exemplary embodiment have been provided with the same reference symbols.

In contrast to the first exemplary embodiment, the coupling element 44' does not comprise a semi-permeable mirror 48, but a reflective mirror 68 which reflects the radiation field 38a in such manner that the latter extends beside the radiation field 38b and in parallel to the propagation direction 60 thereof. The adjustment of the phase of the radiation fields 38a and 38b relative to one another provides the possibility whereby, in the whole of the output radiation field 46', a phase relationship between the radiation fields 38a and 38b can be established in that wave fronts overall parallel to the plane 62 are propagated in the output radiation field 46 in the propagation direction 60.

Figure 4:
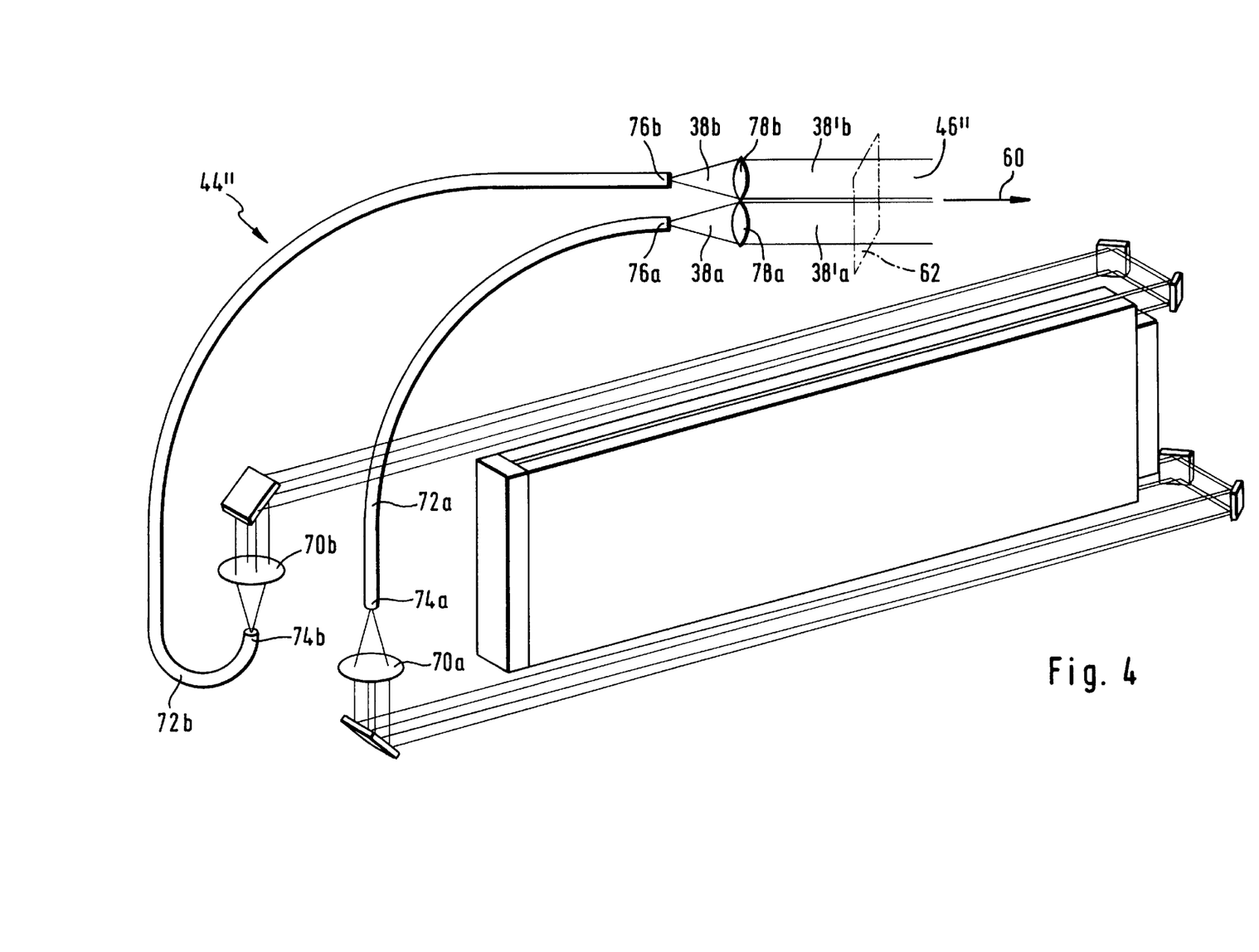
FIG. 4 is a diagram corresponding to FIG. 1 of a second variant of the first exemplary embodiment.

In a second variant of the first embodiment of the invention illustrated in FIG. 4, the respective radiation field 38a and 38b, following balancing by the cylindrical mirrors 43a and 43b, is input-coupled by the coupling element 44" via an input-coupling optical device 70a and 70b in each case into an optical waveguide 72a and 72b at one end 74a and 74b thereof, in which case the respective optical waveguide 72a and 72b conducts the radiation field to a second end 76a and 76b so that the radiation field 38a and 38b issues from this respective end and by means of a further optical device 78a and 78b is in each case formed into a parallel extending radiation field 38?a and 38'b. Here the optical devices 78a and 78b are arranged beside one another in such manner that the radiation fields 38'a and 38'b are also arranged one beside another in the same way as in the case of the first variant of the first exemplary embodiment and form an output radiation field 46", which latter is propagated in the propagation direction 60 and whose common wave fronts, propagated in the direction of propagation 60, extend in parallel to the planes 62, which planes 62 are themselves perpendicular to the propagation direction.

The construction of such optical devices 78a and 78b is described for example in German Patent Application 196 03 111.7, to which reference is made in full in this respect.

Figure 5:
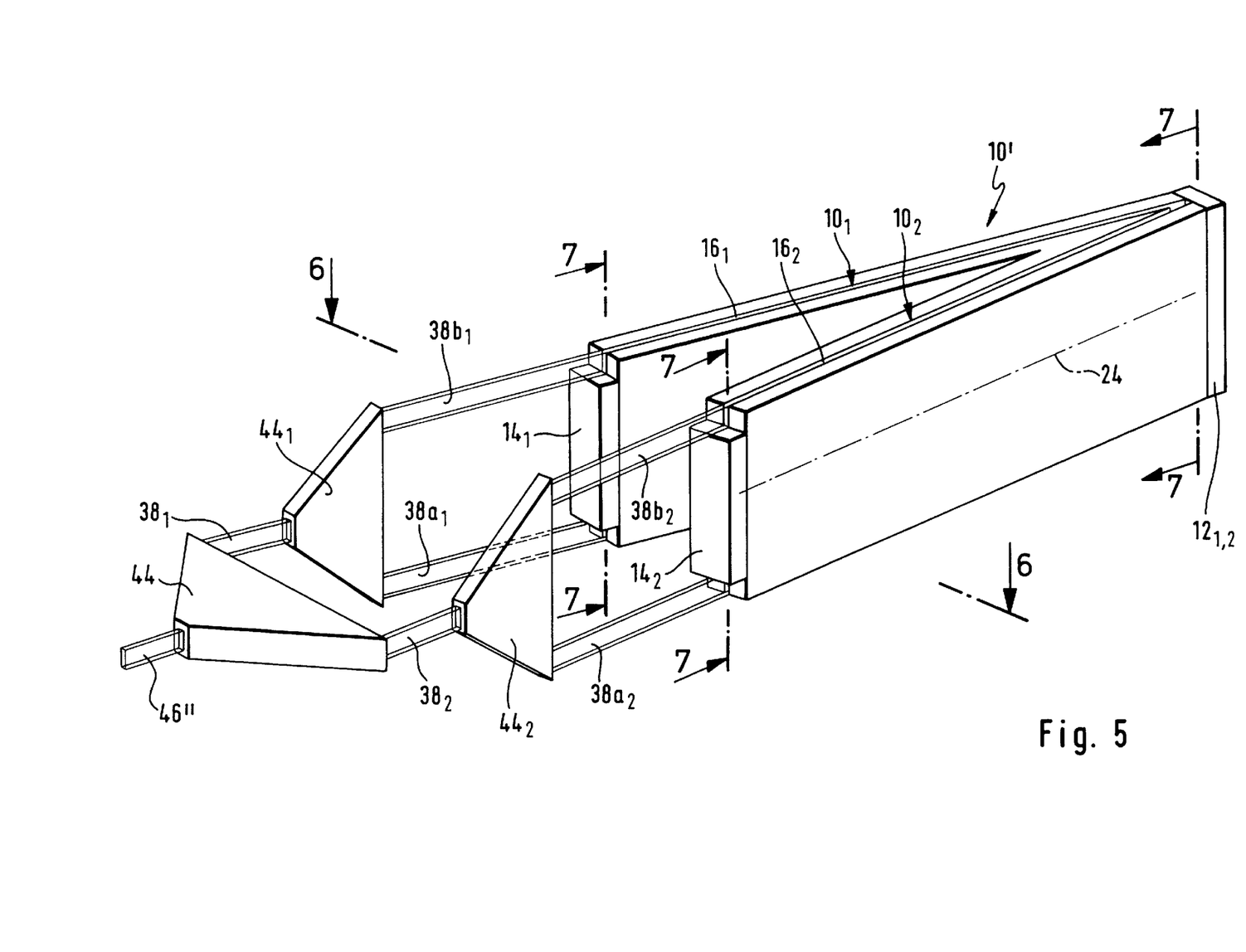
FIG. 5 is a schematic perspective diagram corresponding to FIG. 1 of a second exemplary embodiment of the laser system according to the invention.

In a second exemplary embodiment of a system according to the invention illustrated in FIG. 5, the resonator 10' comprises two resonator sections $10_1$ and $10_2$ which in principle are of the same construction as the resonator 10 in the first exemplary embodiment. That is to say that each resonator section $10_1$ or $10_2$ has a resonator section radiation field $16_1$ and $16_2$ which on the one hand is defined by a convex mirror $14_1$ and $14_2$ and on the other hand is defined by a concave mirror $12_{1,2}$ which serves simultaneously as resonator section coupler.

For the definition of the resonator section radiation field $10_1$, the convex resonator mirror $14_1$ and the concave resonator mirror $12_{1,2}$ are likewise formed as cylindrical mirrors in the same way as in the case of the first exemplary embodiment and are also likewise arranged confocally with one another. The resonator section radiation field $10_2$ is identical to the resonator section radiation field $10_1$ so that the arrangement of the resonator mirrors $14_2$ and $12_{1,2}$ relative to one another is also identical.

Figure 6:
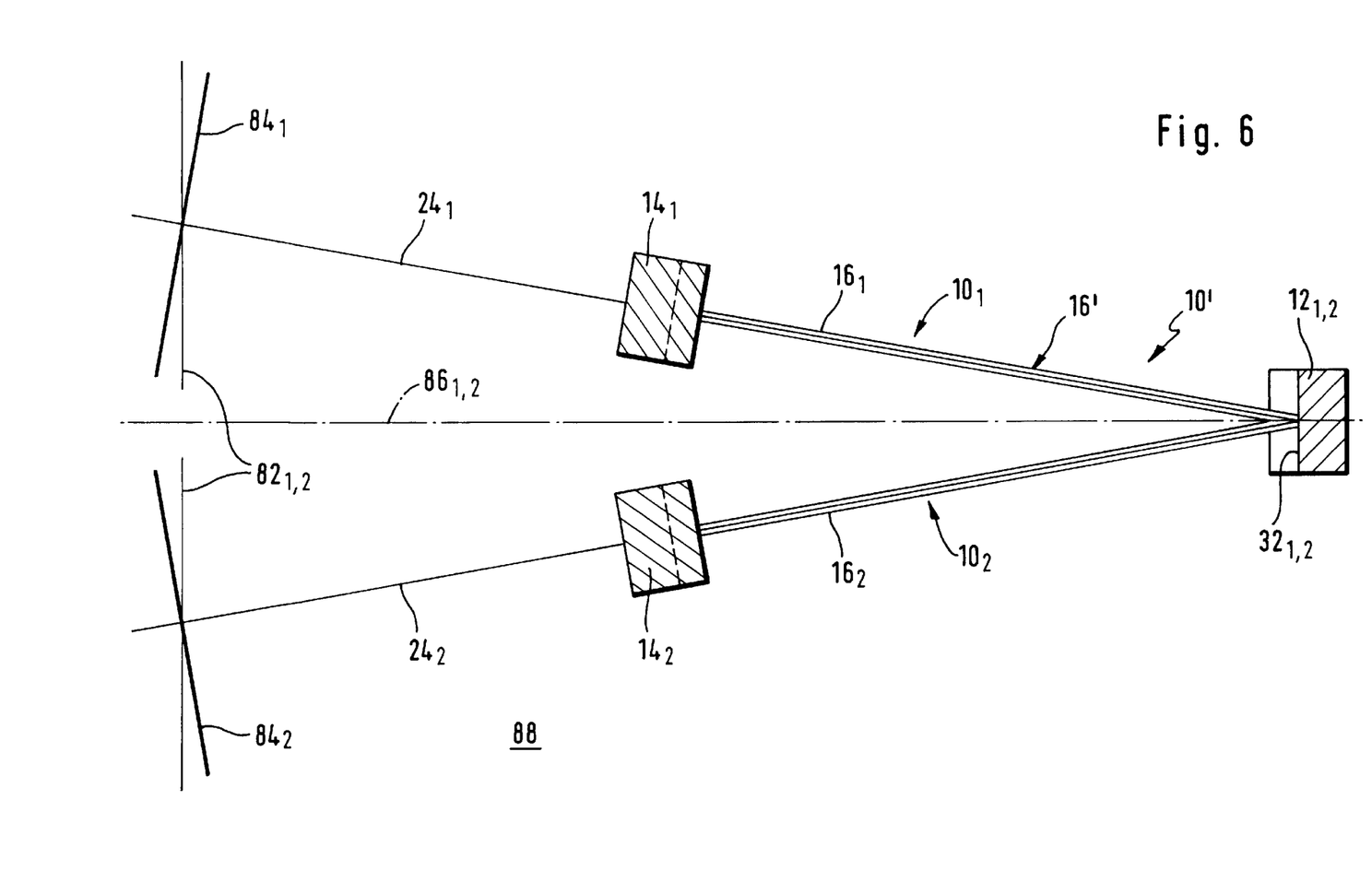
FIG. 6 is a section in a plane referenced 6—6 in FIG. 5, containing a resonator axis of the laser system together with a waveguide (not shown in the drawing)

Here however, axes of curvature $84_1$ and $84_2$ of the convex resonator mirrors $14_1$ and $14_2$ are perpendicular to the respective resonator axis section $24_1$ and $24_2$ while the axis of curvature $82_{1,2}$ of the resonator mirror $12_{1,2}$ is perpendicular to a bisector $86_{1,2}$ of the resonator section axes $24_1$ and $24_2$ as shown in FIG. 6.

In this way each beam which is propagated in the resonator section $10_1$ and strikes the resonator mirror surface $32_{1,2}$ of the resonator mirror $12_{1,2}$ is reflected into the other resonator as $10_2$ and vice versa.

Consequently, in the resonator 10' comprising the two resonator sections $10_1$ and $10_2$, a uniform resonator radiation field 16' comprising the resonator section radiation fields $16_1$ and $16_2$ is formed, although each individual resonator section $10_1$ and $10_2$ is terminated by mirrors $14_1$, $12_{1,2}$, and $14_2$, $12_{1,2}$ which are confocal with one another and thus are formed in accordance with the conditions of an unstable resonator whose radiation field is propagated from the respective resonator section axis $24_1$, $24_2$ at right angles to the latter.

In this embodiment the two resonator section axes $24_1$ and $24_2$ span a plane 88 which in FIG. 6 corresponds to the drawing plane in which the axes of curvature $84_1$ and $84_2$ of the cylindrical convex mirrors $14_1$ and $14_2$ and the axis of curvature $82_{1,2}$ of the cylindrical concave mirror $12_{1,2}$, and moreover the bisector $86_{1,2}$ are also located (FIG. 6).

Figure 7:
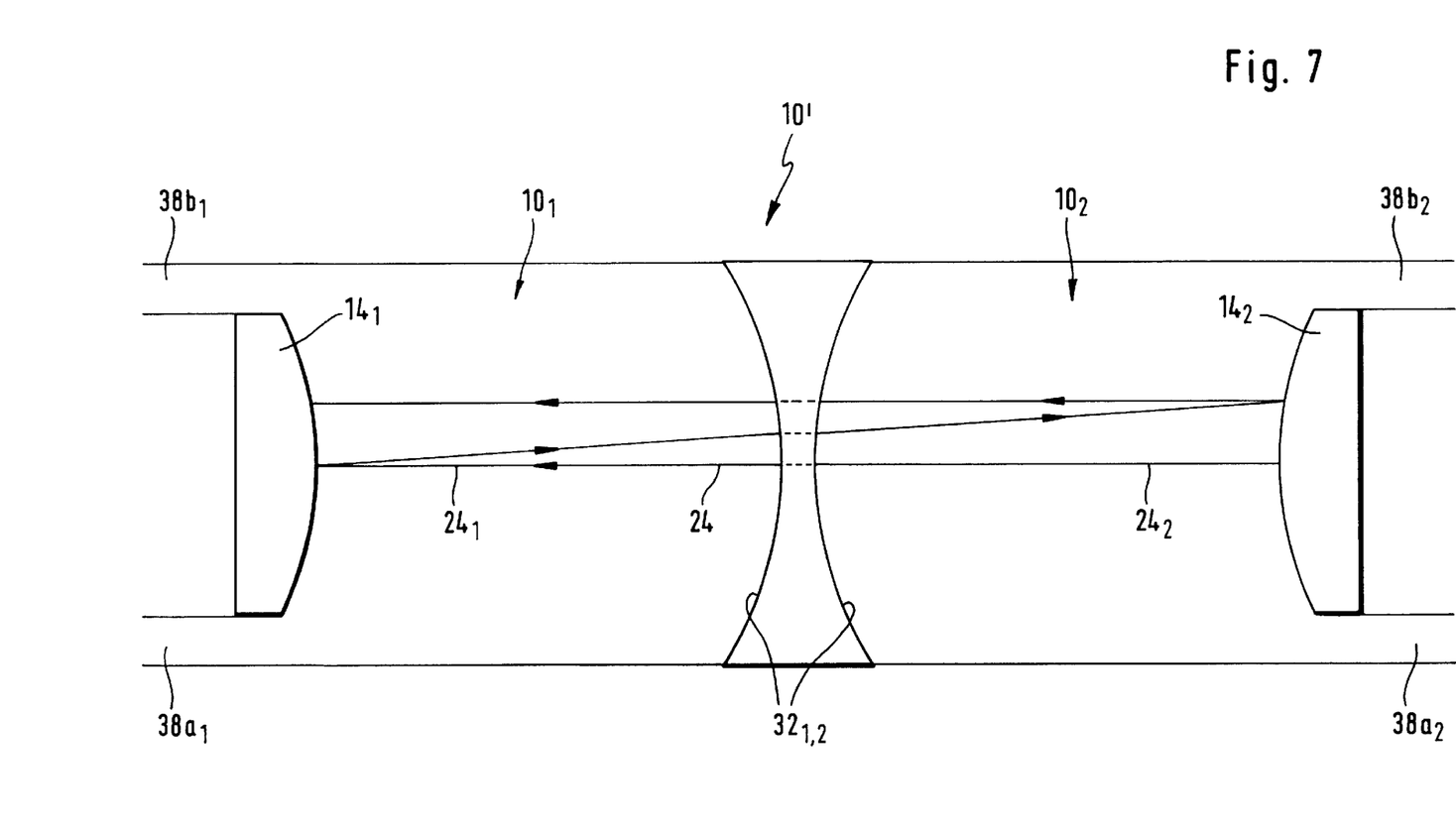
FIG. 7 is a section along the line 7—7 through the two resonator sections illustrated in FIG. 5, the resonator sections being arranged one beside another in the opened-up state.

The beam path will be explained again, making reference to the schematic diagram in FIG. 7. An oscillatory build-up of the resonator 10' takes place in the normal manner over the length predetermined by the resonator axis 24, comprising the resonator section axes $24_1$ and $24_2$, whereupon a beam, which for example strikes the resonator mirror $14_1$, is reflected by said mirror at right angles to the resonator section axis $24_1$ and strikes the resonator mirror surface $32_{1,2}$ of the resonator mirror $12_{1,2}$. From this reflective surface $32_{1,2}$ the beam is simultaneously reflected by the first resonator section $10_1$ into the second resonator section $10_2$ where it is propagated approximately in parallel to the resonator section axis $24_2$, strikes the resonator mirror $14_2$ and is reflected again by the latter at right angles to the resonator section axis $24_2$ and away from said axis towards the resonator mirror $12_{1,2}$ and then is reflected again by the resonator mirror surface $24_{1,2}$ from the resonator section $10_2$ into the resonator section $10_1$ in which the beam is then propagated again in parallel to the resonator section axis $24_1$ in the direction of the resonator mirror $14_1$ etc. Here it can be seen that as a result of this configuration a uniform radiation field is formed in both resonator sections $10_1$ and $10_2$, and, as also shown in FIG. 7, two radiation fields $38a_1$, $38b_1$ and $38a_2$, $38b_2$ issue from each of the resonator sections $10_1$ and $10_2$ so that a total of four radiation fields $38a_1$, $38b_1$, $38a_2$, $38b_2$, coupled out from the overall resonator 10', are present.

These coupled-out radiation fields $38a_1$, $38b_1$ and $38a_2$, $38b_2$ are conducted to coupling elements $44_1$ and $44_2$ and are combined by the latter in pairs to form radiation fields $38_1$ and 382 respectively. These in turn are combined by a coupling element 44 to form the output radiation field 46".

This cascade-like combining of the individual coupled-out radiation fields $38a_1$, $38b_1$ and $38a_2$, $38b_2$ by coupling elements $44_1$, $44_2$, 44 arranged in a cascade-like formation can take place in accordance with the first exemplary embodiment or the first variant of the first exemplary embodiment.

However it is also possible to provide a coupling element 44 in accordance with the second variant of the first exemplary embodiment and thus to achieve a multiple coupling.

Figure 8:
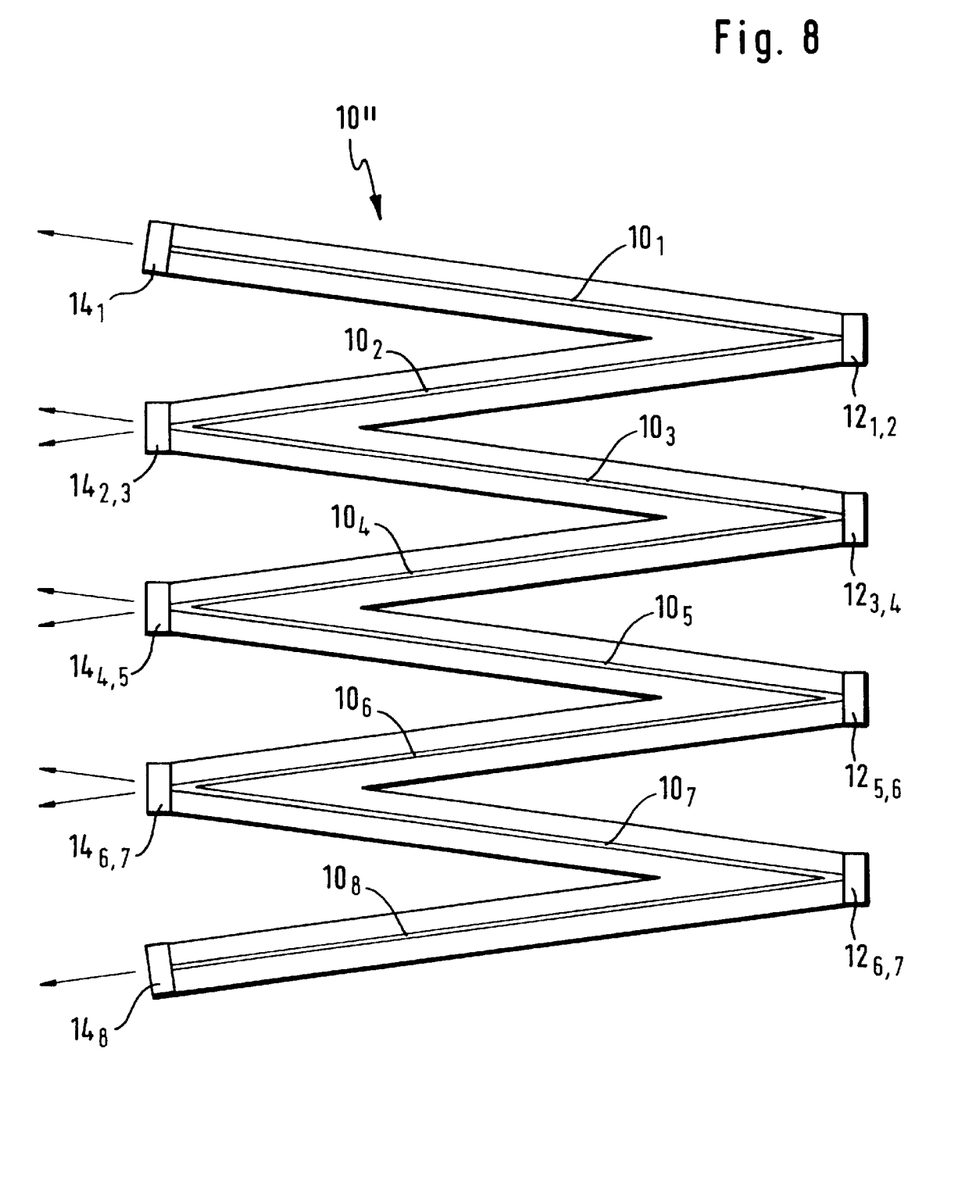
FIG. 8 is a schematic diagram of a third exemplary embodiment in a plan view and FIG. 9 is a schematic diagram of a fourth exemplary embodiment in a plan view.

A third exemplary embodiment, illustrated in FIG. 8, of a laser system according to the invention shows a resonator 10" comprising a plurality of resonator sections $10_1$, $10_2$, $10_3$, $10_4$, $10_5$, $10_6$, $10_7$ and $10_8$ which are successively coupled to one another. The resonator sections $10_1$ to $10_8$ are identical and basically constructed in the same manner as in the case of the second exemplary embodiment, but with the difference that not only the resonator mirror $12_{1,2}$ but also the resonator mirror $14_{2,3}$ has the form of a resonator section coupler, in the same way as the other resonator mirrors $12_{3,4}$, $12_{5,6}$ and $12_{6,7}$ as well as the resonator mirrors $14_{4,5}$ and $14_{6,7}$. Only the resonator mirrors $14_1$ and $14_8$ are designed and arranged in the same manner as the resonator mirrors $14_1$ and $14_2$ of the second exemplary embodiment.

Thus in each case two radiation fields 38a and 38b issue from each of the resonator sections $10_1$ to $10_8$ on both sides of the respective resonator mirrors 14, which radiation fields are conducted to a coupling element and combined by the latter in phase-defined fashion to form the output radiation field 46 with a substantially flat wave front.

Figure 9:
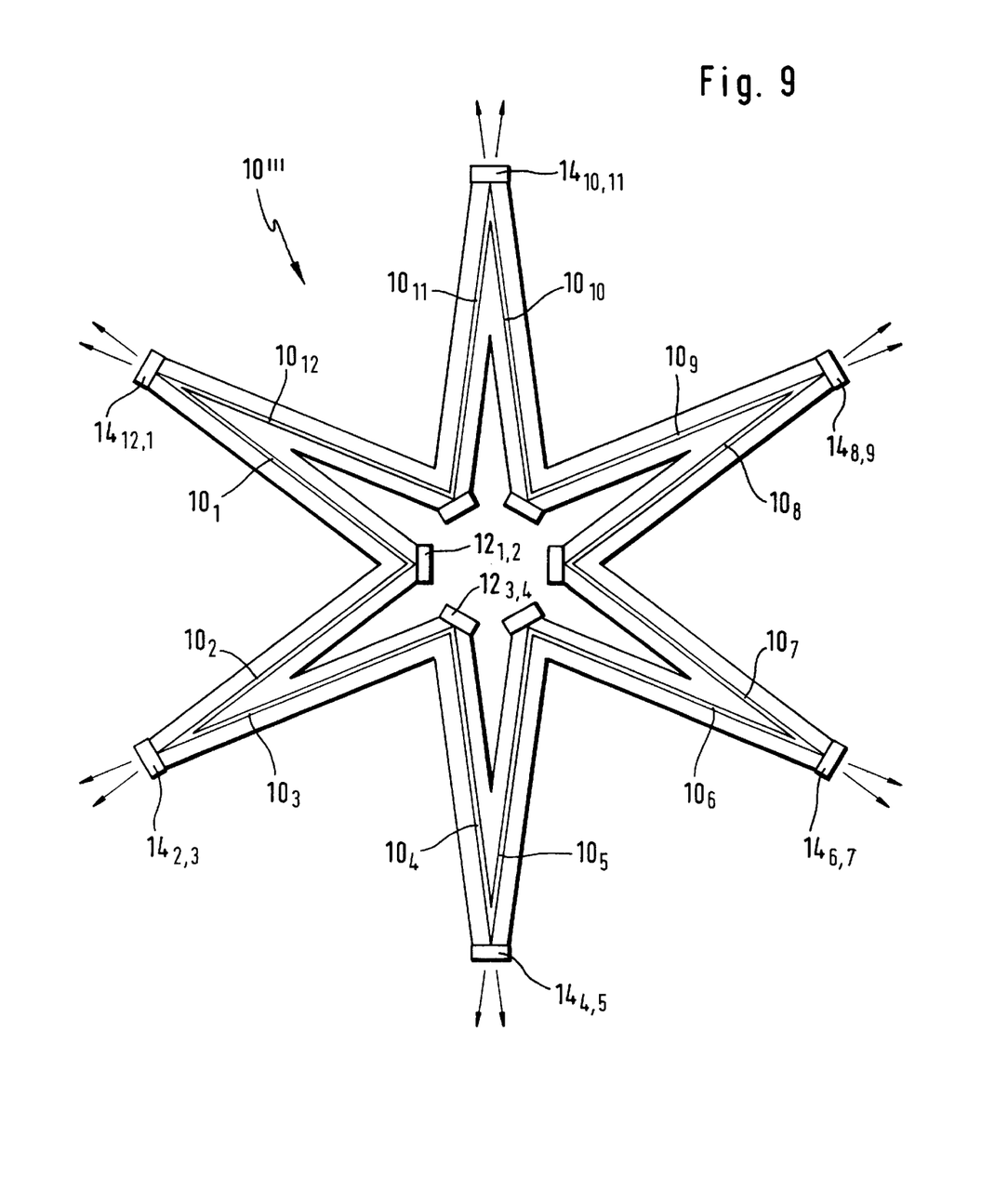

In a fourth exemplary embodiment, illustrated in FIG. 9, the resonator 10''' likewise comprises a plurality of resonator sections $10_1$ to $10_{12}$, all of which are cyclically coupled to one another in that all the resonator mirrors 12 and 14 have the form of resonator section couplers, resulting in a resonator radiation field 16''' permeating all the resonator sections $10_1$ to $10_{12}$, where in each of the resonator sections $10_1$ to $10_{12}$ two radiation fields 38a and 38b are coupled out, conducted to the coupling element and combined with one another in phase-defined manner to form the output radiation field 46.

In all of the exemplary embodiments it has been assumed in the foregoing that the resonator mirrors 12 and 14 produce a resonator radiation field 16 which is formed symmetrically to the resonator axis 24. However it is also conceivable to design the resonator mirrors 12 and 14 such that they extend only towards one side of the resonator axis 24 and thus generate a resonator radiation field which extends only towards one side of the resonator axis 24 and then represents half of the symmetrical resonator radiation field, as disclosed for example in EP 0 305 893.

In all of the exemplary embodiments no precise definition of the construction of the laser-active medium has been given. Preferably, a gas arranged between the waveguide surfaces 20 and 22 of the respective waveguide 18 is provided as laser-active medium. This laser gas can be excited in various ways. For example, the laser gas can be excited in the course of its circulation and can flow through the waveguide 18 for example at right angles to the resonator axis 24 and in the transverse direction in parallel to the waveguide surfaces 20 and 22. However it is particularly advantageous for the laser gas not to be excited and cooled in the course of its circulation but to be cooled by diffusion and cooling in the region of the waveguide surfaces 20 and 22. In this case the waveguide surfaces 20 and 22 are cooled surfaces, for example the surfaces of planar cooling elements.

A particularly expedient variant provides that the waveguide surfaces 20 and 22 are simultaneously electrode surfaces of a high frequency electrode with which a high-frequency excitation of the laser gas arranged between the waveguide surfaces 20 and 22 takes place. Such a laser system has been disclosed in EP 0 305 893, to which reference is made in full.

We claim:

1. A laser system comprising a laser-active medium which is arranged between mutually opposed waveguide surfaces of an optical waveguide and a resonator which by means of resonator mirrors defines a coherent resonator radiation field permeating the optical waveguide, a plurality of mutually coherent radiation fields coupled out from said resonator radiation field, said plurality of radiation fields being guided as to a coupling element, said coupling element combining said plurality of radiation fields with a defined mutual phase relationship to form one single coherent output radiation field.

2. A laser system according to claim 1, characterized in that at least one of said radiation fields passes through a phase adjusting element upstream of the coupling element.

3. A laser system according to claim 1, characterized in that the coupling element superimposes said radiation fields in the output radiation field.

4. A laser system according to claim 1, characterized in that the coupling element arranges said radiation fields one beside another in the output radiation field.

5. A laser system according to claim 1, characterized in that for the formation of one single output radiation field a plurality of coupling elements, arranged in a cascade-like formation, are provided.

6. A laser system according to claim 1, characterized in that the output radiation field has substantially flat wave fronts.

7. A laser system according to claim 1, characterized in that said plurality of radiation fields have a coherence length of more than 50 cm.

8. A laser system according to claim 1, characterized in that the resonator has the form of an unstable resonator.

9. A laser system according to claim 8, characterized in that the resonator has the form of a resonator operating in the transversal basic mode.

10. A laser system according to claim 8, characterized in that the resonator comprises resonator mirrors which are curved in the transverse direction extending at right angles to the resonator axis but have no curvature perpendicular to the transverse direction and at right angles to the resonator axis.

11. A laser system according to claim 10, characterized in that the resonator mirrors have cylindrical mirror surfaces.

12. A laser system according to claim 8, characterized in that the resonator comprises resonator mirrors arranged in pairs confocally with one another.

13. A laser system according to claim 1, characterized in that the resonator comprises a plurality of resonator sections which are permeated by the coherent resonator radiation field and in which there extends a resonator section radiation field which is guided by the optical waveguide and extends between two resonator mirrors.

14. A laser system according to claim 13, characterized in that the resonator radiation field permeates the resonator sections consecutively in the radiation propagation direction.

15. A laser system according to claim 14, characterized in that the resonator section axes of consecutive resonator sections form an acute angle with one another.

16. A laser system according to claim 13, characterized in that the resonator section radiation fields of consecutive resonator sections are coupled by a resonator mirror arranged as resonator section coupler.

17. A laser system according to claim 16, characterized in that the resonator mirror in the form of the resonator section coupler reflects the whole of the resonator section radiation field of the one resonator section into the other resonator section in parallel to one single reflection plane, with the same reflection angle.

18. A laser system according to claim 17, characterized in that the axes of curvature of the resonator mirrors are located in said reflection plane.

19. A laser system according to claim 17, characterized in that said reflection plane extends at right angles to the waveguide surfaces of the waveguide.

20. A laser system according to claim 17, characterized in that all the reflection planes of all the resonator mirrors in the form of resonator section couplers extend in parallel to one another.

21. A laser system according to claim 13, characterized in that the resonator section radiation fields are of identical formation.

22. A laser system according to claim 13, characterized in that at least one radiation field is coupled out from each resonator section radiation field.

23. A laser system according to claim 22, characterized in that two radiation fields are coupled out from each resonator section radiation field.

24. A laser system according to claim 13, characterized in that each of the resonator section radiation fields is formed symmetrically to the resonator axis.

* * * * *